United States Patent
Morris et al.

(10) Patent No.: US 10,109,871 B2
(45) Date of Patent: Oct. 23, 2018

(54) METHOD OF FORMING A BIPOLAR SEPARATOR ASSEMBLY

(71) Applicant: FuelCell Energy, Inc., Danbury, CT (US)

(72) Inventors: William Morris, Newtown, CT (US); Michael Primerano, Winsted, CT (US); Lawrence J. Novacco, Brookfield, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 341 days.

(21) Appl. No.: 15/055,714

(22) Filed: Feb. 29, 2016

(65) Prior Publication Data
US 2016/0285115 A1 Sep. 29, 2016

Related U.S. Application Data

(62) Division of application No. 13/150,838, filed on Jun. 1, 2011, now Pat. No. 9,306,225.

(51) Int. Cl.
  *H01M 8/0297* (2016.01)
  *H01M 8/0254* (2016.01)
  (Continued)

(52) U.S. Cl.
  CPC ....... *H01M 8/0297* (2013.01); *H01M 8/0202* (2013.01); *H01M 8/026* (2013.01);
  (Continued)

(58) Field of Classification Search
  CPC .......... H01M 8/145202; H01M 8/0247–8/258
  See application file for complete search history.

(56) References Cited

U.S. PATENT DOCUMENTS

| 4,609,595 A | 9/1986 | Nickols |
| 5,378,247 A | 1/1995 | Sasaki et al. |
(Continued)

FOREIGN PATENT DOCUMENTS

| EP | 1 942 539 A1 | 7/2008 |
| JP | 62-268065 | 11/1987 |
| WO | WO-2006/111990 | 10/2006 |

OTHER PUBLICATIONS

Extended European Search Report in EP Application No. 12793997.3 dated Jun. 15, 2015 (13 pages).
(Continued)

*Primary Examiner* — Stephan J Essex
(74) *Attorney, Agent, or Firm* — Foley & Lardner LLP

(57) ABSTRACT

A method of forming a bipolar separator assembly for use in a fuel cell assembly includes a step of forming an anode-side sub-assembly, which comprises sub-steps of: providing an anode current collector, providing a plate member, first and second opposing end segments and third and fourth opposing end segments, positioning said plate member so that said anode current collector abuts the first surface of the plate member, providing first and second anode wet seal members, and releasably securing the first and second anode wet seal members to the plate member; a step of forming a cathode-side sub-assembly, which comprises sub-steps of: providing a cathode current collector; providing first and second cathode wet seal members; and releasably securing the first and second cathode wet seal members to the cathode current collector; and a step of assembling the cathode-side sub-assembly with the anode-side sub-assembly.

16 Claims, 10 Drawing Sheets

(51) Int. Cl.
  *H01M 8/0276*  (2016.01)
  *H01M 8/14*  (2006.01)
  *H01M 8/241*  (2016.01)
  *H01M 8/026*  (2016.01)
  *H01M 8/2457*  (2016.01)
  *H01M 8/2483*  (2016.01)
  *H01M 8/0202*  (2016.01)
  *H01M 8/0247*  (2016.01)
  *H01M 8/0271*  (2016.01)
  *H01M 8/0258*  (2016.01)

(52) U.S. Cl.
  CPC ....... *H01M 8/0247* (2013.01); *H01M 8/0254* (2013.01); *H01M 8/0258* (2013.01); *H01M 8/0271* (2013.01); *H01M 8/0276* (2013.01); *H01M 8/145* (2013.01); *H01M 8/241* (2013.01); *H01M 8/2457* (2016.02); *H01M 8/2483* (2016.02); *H01M 2008/147* (2013.01); *Y02E 60/50* (2013.01); *Y02E 60/526* (2013.01); *Y02P 70/56* (2015.11); *Y10T 29/49915* (2015.01)

(56) References Cited

U.S. PATENT DOCUMENTS

| | | | |
|---|---|---|---|
| 6,372,374 B1* | 4/2002 | Li | H01M 8/0228 429/469 |
| 7,566,512 B2 | 7/2009 | Bednarz et al. | |
| 2004/0157106 A1* | 8/2004 | Sugiura | H01M 8/02 429/465 |
| 2007/0231659 A1* | 10/2007 | Ma | H01M 8/0247 429/444 |
| 2008/0193824 A1 | 8/2008 | Fasce et al. | |

OTHER PUBLICATIONS

International Search Report of International Application No. PCT/US2012/038536 dated Jan. 2, 2013 (3 pages).
Supplementary Partial European Search Report in EP Application No. 12793997.3 dated Nov. 20, 2014 (5 pages).

* cited by examiner

METHOD OF FORMING A BIPOLAR SEPARATOR ASSEMBLY

CROSS-REFERENCE TO RELATED PATENT APPLICATIONS

This application is a Divisional of U.S. application Ser. No. 13/150,838, filed Jun. 1, 2011, incorporated herein by reference in its entirety.

BACKGROUND OF THE INVENTION

This invention relates to a bipolar separator assembly and, in particular, to a bipolar separator for use in molten carbonate fuel cells.

A fuel cell is a device that directly converts chemical energy in the form of a fuel into electrical energy by way of an electrochemical reaction. In general, like a battery, a fuel cell includes a negative electrode or anode and a positive electrode or cathode separated by an electrolyte that serves to conduct electrically charged ions between them. In contrast to a battery, however, a fuel cell will continue to produce electric power as long as fuel and oxidant are supplied to the anode and cathode, respectively. In order to produce a useful amount of power, individual fuel cells are typically arranged in stacked relationship in series.

In molten carbonate fuel cells, an electrically conductive bipolar separator is used to separate adjacent cells in a fuel cell stack. The main functions of a bipolar separator of molten carbonate fuel cells are to separate cathode gas from the anode gas and to provide current transmission and load pressure distribution in high temperature corrosive environment. A typical bipolar separator comprises a thin flat metal plate member, or separator sheet, having first and second opposing surfaces which form active areas and which are compatible with oxidant and fuel gases, respectively. First and second opposing ends of these areas are folded upward and toward each other to form first and second pockets. Third and fourth opposing ends of the areas are folded downward and toward each other to form third and fourth pockets. The first and second pockets support a fuel cell matrix on the first surface side of the plate member, while third and fourth pockets support a fuel cell matrix on the opposing second surface side of the plate member. In this way, the first, second, third and fourth pockets form wet seals for the molten carbonate fuel cells that seal both the separator sheet and the matrix and create flow fields for the fuel and oxidant gases.

In order to realize long-term stability of the fuel cell, the wet seals and edges of the separator sheet must be kept corrosion free. In addition, corner areas of an externally manifolded fuel cell stack are critical for sealing to the manifold and thus, typically need to be as flat as possible. U.S. Pat. No. 6,372,374, assigned to the same assignee herein, discloses a bipolar separator with improved wet seals in which the wet seals are made separately from the separator sheet and are then welded to the separator sheet during the assembly process. In the configuration disclosed in the '374 patent, the anode and cathode current collectors extend into the pockets formed by the attached wet seals, which provide uniform support to the electrodes and the matrix. These features of the bipolar separator are important to the performance of the fuel cell system.

When the bipolar separator of the '374 patent is manufactured and assembled, the five components of the separator, i.e. one plate member and four wet seal pockets, have to be welded together. The welding of these components results in a weld around the entire perimeter of the bipolar separator, which in typical fuel cells is about 160" of weld. In addition, portions of this weld extend in the corner areas of the fuel cell stack, which, as mentioned above, are critical for sealing and supporting the external manifolds against the fuel cell stack. However, the welding process is difficult and costly. In addition, to obtain consistent results, it is necessary to weld the wet seal pockets to the plate member before the corrugated current collectors are in place which allows for properly fixturing with chill-blocks. Since the corrugated current collectors extend under the wet seal pockets, the current collectors need to be deformed and manipulated in order to slide them into place. However, this process requires several people to perform and is very difficult to automate effectively.

Therefore, it is an object of the present invention to provide a bipolar separator assembly which includes wet seal pockets made separately from the plate member but which does not require welding around the entire perimeter of the bipolar separator in order to attach the wet seal pockets to the plate member.

In addition, it is a further object of the present invention to eliminate manual manipulation and installation of the corrugated current collectors into the bipolar separator, and in particular, into the areas under the wet seal pockets of the bipolar separator.

SUMMARY OF THE INVENTION

The above and other objectives are realized in a bipolar separator assembly for use with a fuel cell comprising: a plate member having opposing first and second surfaces compatible with fuel gas and oxidant gas, respectively, the plate member having first and second opposing end segments and third and fourth opposing end segments which are transverse to the first and second opposing end segments; first and second pocket members situated adjacent the first and second end segments and extending outward of the first surface, the first and second pocket members being adapted to enclose opposing ends of an anode current collector, and third and fourth pocket members situated adjacent the third and fourth end segments and extending outward of the second surface, the third and fourth pocket members being adapted to enclose opposing ends of a cathode current collector, wherein at least a portion of each of the first, second, third and fourth pocket members is formed separately from the plate member and is releasably positioned relative to the plate member. The first end segment of the plate member forms a first portion of the first pocket member and the second end segment of the plate member forms a first portion of the second pocket member, and a second portion of each of the first and second pocket member is formed separately from the plate member and is releasably secured to the respective first or second end segment of the plate member. In addition, the third and fourth pocket are formed separately from the plate member and are releasably positioned adjacent the third and fourth end segments of the plate member, respectively, so that when the bipolar plate member is assembled into the fuel cell stack, the third and fourth pocket members are secured at their respective positions relative to the plate member using pressure in the fuel cell stack.

In certain embodiments, the plate member comprises a planar central area disposed between the first and second end segments, and each of the first and second end segments includes: a first portion co-planar with, and extending from, the central area, a second portion following the first portion and extending transverse to the first portion outwardly from the first surface of the first portion, and a third portion following the second portion and extending transverse to the second portion in a direction away from, and substantially parallel to, the first portion. In such embodiments, the first and second portion of the first end segment form the first portion of the first pocket member, and the first and second portions of the second end segment form the first portion of the second pocket member. Moreover, in such embodiments, the second portion of each of the first and second pocket members is formed by an anode wet seal member which is releasably secured to the plate member, wherein the anode wet seal member includes first and second legs integrally connected to one another, with the second leg being parallel to the first leg and being shorter than the first leg. When the anode wet seal member is releasably secured to the respective first or second segment of the plate member, one part of the first leg forms the second portion of the respective first or second pocket member and another part of the first leg extends along the third portion of the respective first or second end segment, and the second leg of the anode wet seal member is hemmed around the third portion of the respective first or second end segment and abuts the second surface of the third portion of the respective first or second end segment. Each anode wet seal member also includes first and second extensions at opposing sides of the first leg and extending from the one part of the first leg that forms the second portion of the pocket, so that when the anode wet seal member is secured to the plate member, the first and second extensions are folded toward the first portion of the respective first or second end segment of the plate member to form end walls of the pocket.

Each of the third and fourth pockets is formed by a cathode wet seal member which is separate from the plate member and which abuts the respective third or fourth end segment of the plate member. Each cathode we seal member includes a bottom wall abutting the respective third or fourth end segment, a top wall opposing the bottom wall, and an outer sidewall connecting the top and bottom walls and opposing end walls. In addition, each cathode wet seal member includes a main portion and first and second corners extending from opposing ends of the main portion to form opposing corners of the respective third or fourth pocket. The main potion includes the bottom wall of the respective third or fourth pocket and central portions of the top wall and the outer sidewall of the respective third or fourth pocket. Each of the first and second corners of the cathode wet seal member includes an end wall and end portions of the top wall and the outer sidewall of the respective third or fourth pocket, wherein the end wall and the end portion of the outer sidewall extend beyond the height of the central portion of the outer sidewall and at least up to the third portion of the respective first or second end segment of the plate member.

In certain embodiments, the plate member includes two S-shaped protrusions protruding outwardly from an outer edge of the third end segment and aligned with the first and second end segments of the plate member so that a central portion of each S-shaped protrusion is co-extensive with the second portion of the first or second end segment. Similarly, the plate member may include two S-shaped protrusions protruding outwardly from an end of the fourth end segment and aligned with the first and second end segments of the plate member so that the central portion of each S-shaped protrusion is co-extensive with the second portion of the respective first or second end segment. In addition, each corner of the cathode wet seal member forming the third or fourth pocket may include an S-shaped notch in the end portion of its outer sidewall to allow a corresponding S-shaped protrusion to pass therethrough. In other embodiments, the shape of the protrusions is varied, so that for example, in some embodiments, the protrusion only includes the central portion co-extensive with the second portion of the respective first and second segment. In such embodiments, notches in the cathode wet seal member corresponding in shape and position to the protrusions may be included, or may be omitted.

A fuel cell stack assembly which includes the bipolar separator assembly described above is also described. Moreover, an assembly and a method of forming the assembly that includes an anode-side sub-assembly and a cathode-side sub-assembly are also described. In such assembly, the anode-side sub-assembly includes the plate member having first and second opposing surfaces compatible with furl and oxidant gases, respectively, first and second opposing end segments and third and fourth opposing segments transverse to the first and second opposing end segments, an anode current collector abutting the first surface of the plate member, and first and second anode wet seal members formed separately from the plate member and releasably secured to the plate member so as to form first and second pockets on the first surface of the plate member adjacent the first and second opposing end segments with the first and second pockets enclosing opposing ends of the anode current collector. The cathode-side sub-assembly comprises first and second cathode wet seal members formed separately from the plate member of the anode-side subassembly and adapted to form third and fourth pockets on the second surface of the plate member and to be releasably positioned adjacent the third and fourth opposing end segments, and a cathode current collector cooperating with the first and second cathode wet seal members so that the third and fourth pocket members enclose opposing ends of the cathode current collector. In forming the assembly, the cathode-side sub-assembly is assembled with the anode-side sub-assembly so that the cathode-side sub-assembly abuts the second surface of the plate member of the anode-side sub-assembly and the first and second cathode wet-seal members form the third and fourth pockets adjacent the second surface of the plate member. The method of forming the assembly may be automated.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

FIGS. 1-4 show portions of the bipolar separator assembly 100 of the present invention which includes a separator plate member 102 and a plurality of wet seal pocket members 104 which are either formed separately from the separator plate member 102 or portions of which are formed separately from the separator plate member 102. As discussed herein below, the wet seal pocket members 104, or portions thereof are attached to, or coupled with, the separator plate member 102 without the need to use welding, or with only limited use of welding. In addition, each wet seal pocket member 104 is configured so that an end of a current collector can be inserted into the wet seal pocket. Moreover, as discussed in more detail below, the bipolar separator assembly 100 provides additional sealing in the corner areas of the assembly and uses the pressure of manifold sealing gaskets for further sealing between the fuel and oxidant sides in the corner areas of the stack.

Figure 1:
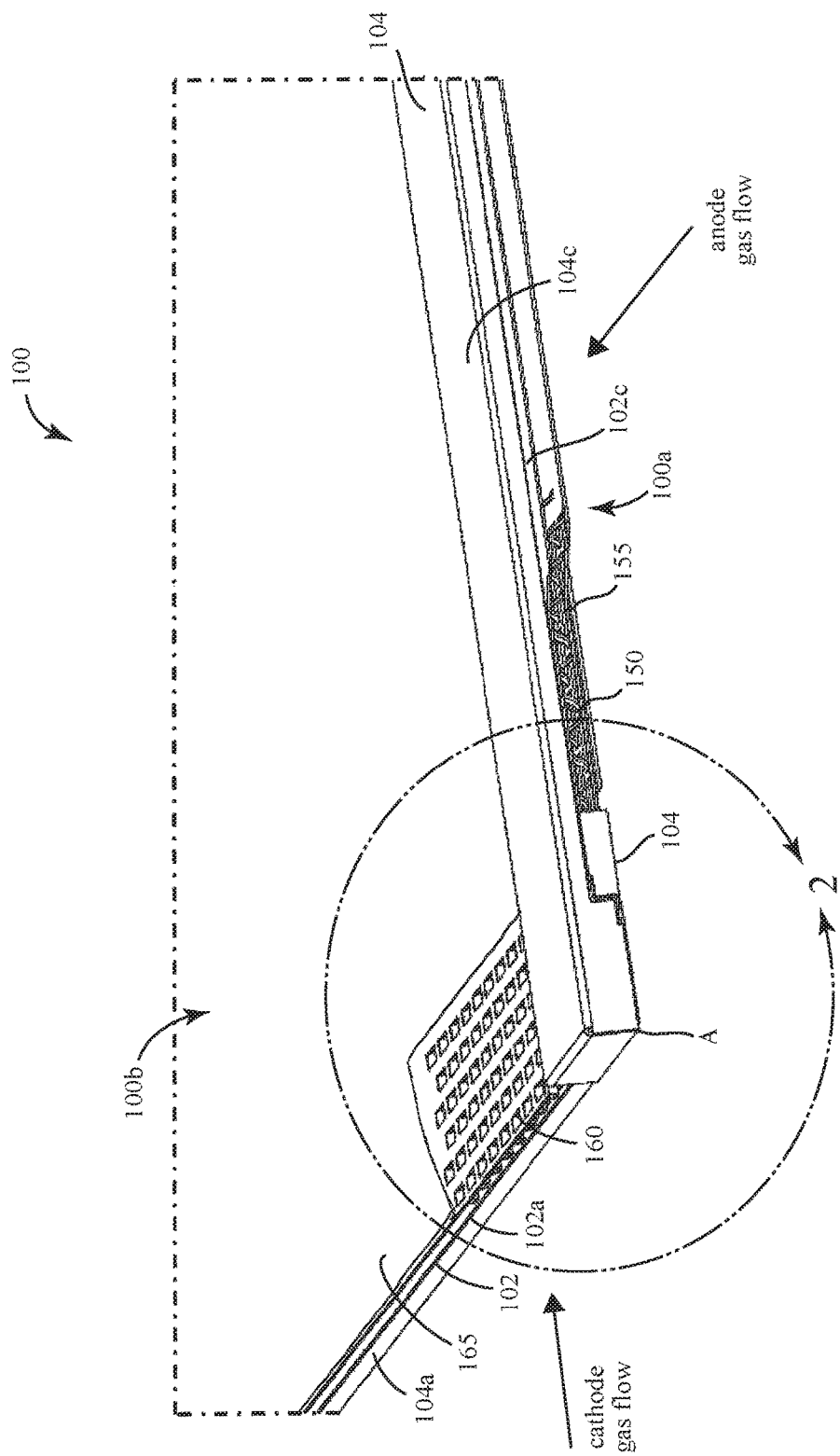
FIG. 1 shows a corner of a bipolar separator assembly of the present invention.

FIG. 1 shows a corner portion of the bipolar separator assembly 100 of the present invention with current collectors and electrodes abutting the bipolar separator assembly. In particular, the bipolar separator assembly 100 includes first and second opposing surfaces 100a, 100b, compatible with an anode side of a first fuel cell and a cathode side of a second fuel cell, respectively. As shown in FIG. 1, an anode current collector 150 abuts the first surface 100a of the bipolar separator assembly and an anode electrode 155 abuts the anode current collector 150. Similarly, a cathode current collector 160 abuts the second surface 100b of the bipolar separator assembly and a cathode electrode 165 abuts the cathode current collector 160.

As shown and discussed in more detail below, the bipolar separator assembly 100 includes the separator plate member 102 having the opposing first and second surfaces 100a, 100b, which are compatible with fuel and oxidant gases, respectively, and a plurality of wet seal pocket members 104, at least a portion of each pocket member being formed separately from the plate member 102 and attached or coupled to the plate member 102. The separator plate member 102 of the present illustrative embodiment has a substantially rectangular shape and includes first and second opposing end sections 102a, 102b (end section 102b is not visible in FIG. 1) and opposing end sections 102c, 102d (end section 102d is not visible in FIG. 1) transverse to the opposing end sections 102a, 102b. Adjacent each of the end sections, the plate member 102 includes a wet seal pocket member 104. In particular, wet seal pocket members 104a, 104b are situated adjacent opposing end sections 102a, 102b of the plate member 102 so as to form pockets on the first surface 100a of the plate member. Wet seal pocket members 104c, 104d are situated adjacent opposing end sections 102c, 102d of the plate member 102 so as to form pockets on the second surface 100b of the plate member. As will be discussed in more detail below, the wet seal pocket members 104a-d, or portions thereof, are formed separately from the plate member 102 and are attached to the plate member 102 either without welding or using only limited welding. The pocket members 104a-d form wet seal regions of the fuel cell stack, while the central area of the bipolar separator assembly 100 between the pocket members forms the active area of the fuel cell stack.

As shown in FIG. 1, the anode current collector 150 abuts the first surface 100a of the separator plate member 102, with opposing end portions of the anode current collector 150 extending into, and being housed underneath, the wet seal pocket members 104a, 104b. The anode electrode 155 abutting the anode current collector 150 is disposed in the central area of the bipolar separator assembly 100. The cathode current collector 160 abuts the second surface 100b of the separator plate member 102 with opposing end portions of the cathode current collector 160 extending into, and being housed underneath, the wet seal pocket member 104c, 104d. The cathode electrode 165 abutting the cathode current collector 160 is disposed in the central area of the bipolar separator assembly 100. In the illustrative embodiment shown in FIG. 1, the anode and cathode current collectors 150, 160 are corrugated current collectors, with the corrugations of the current collectors forming flow channels for the reaction gases.

Figure 2:
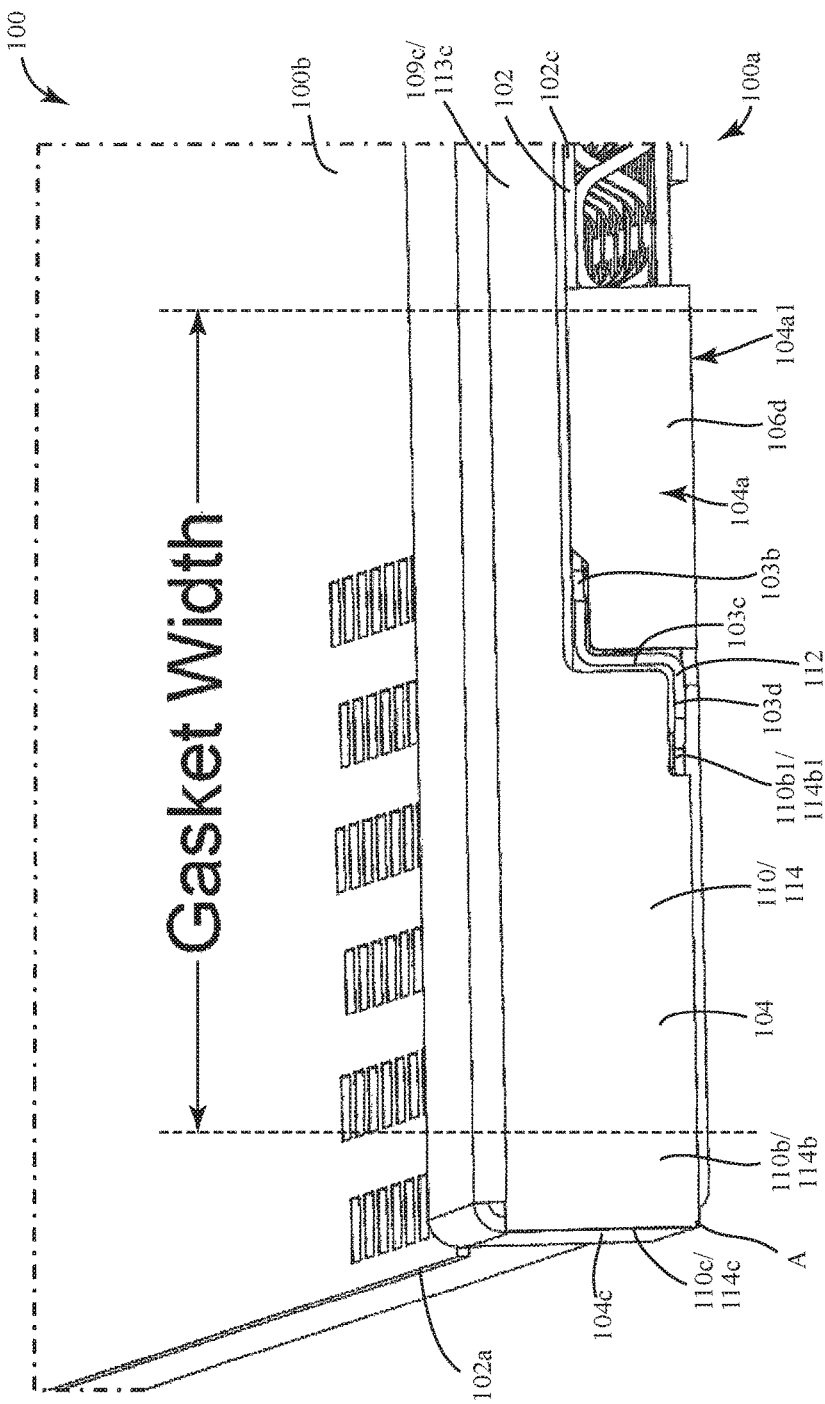
FIG. 2 shows a close up view of the bipolar separator assembly corner of FIG. 1.

FIG. 2 shows a more detailed view of the assembled corner of the bipolar separator assembly 100 of FIG. 1, without the cathode and anode electrodes. The separator plate member 102 of the separator assembly separates the fuel gas from the cathode gas and each surface 100a, 100b of the plate member includes the central area and two opposing end sections 102a-b or 102c-d. In the embodiment of FIGS. 1-4, the separator plate member 102 has a substantially planar central area 103a, corresponding to the central area of the anode side surface 100a, and S-shaped end portions at opposing ends forming each of the end sections 102a-b. In particular, each end section 102a, 102b of the separator plate member 102, adjacent to which the pocket member 104a, 104b is situated, has the substantially S-shaped cross-section, and includes a first portion 103b extending from the planar central area 103a and co-planar with the central area 103a. The first portion 103b is followed by a second portion 103c transverse to the first portion 103b and formed by bending the separator plate member in the direction of the anode side 100a of the bipolar separator assembly. The second portion 103c is then followed by a third portion 103d transverse to the second portion 103c and formed by bending the separator plate member outwardly. In the embodiment shown, the second portion 103c of the end section 102a is substantially perpendicular to the first and third portions 103b, 103d, and the third portion 103d extends in a plane that is parallel to the plane of the first portion 103b. In this way, the first, second and third portions 103b-d of each end section 102a, 102b form a step in the separator plate member 102.

As shown in FIG. 2, the first portion 103b of the end section 102a forms an upper wall of the pocket member 104a and the second portion 103c of the end section 102a forms a sidewall of the pocket member 104a. The remaining portions of the pocket member 104a are formed separately from the plate member 102, as shown in FIG. 3 and are coupled to the plate member without use of welding or with only limited use of welding. Although not shown, the pocket member 104b is formed similarly to the pocket member 104a, so that the first and second portions 103b, 103c of the end section 102b form the upper wall and a sidewall, respectively, of the pocket member 104b and the remaining portions of the pocket member 104b are formed separately from the plate member 102 and thereafter coupled to the plate member.

The S-shaped end sections 102a, 102b of the plate member 102 extend across the entire width of the plate from an edge of the end section 102c to an opposing edge of the end section 102d. As a result, the end section 102c of the plate member overlaps with the end section 102a at a corner A of the plate member, and the end section 102d overlaps with the end section 102a at a second corner B (not shown in FIG. 2) of the plate member. Similarly, the end section 102c overlaps with the end section 102b at a third corner C (not shown in FIG. 2), which is opposite the corner A and diagonal from the second corner B, and the end section 102d overlaps with the end section 102b at a fourth corner D (not shown in FIG. 2) which is opposite the corner B and diagonal from the third corner A. The configuration of the plate member 102, and in particular, the folds in the plate member forming the S-shaped end sections 102a, 102b prevent the fuel gas flowing along the anode side of the fuel cell from reaching the corner of the fuel cell stack. In this way, even if the corners of the fuel cell stack are not sufficiently sealed off, the fuel gas is prevented from diffusing through the corners and is sealed from the oxidant gas flowing through the cathode side of the fuel cell because the plate member configuration does not allow the fuel to reach the corners of the fuel cell stack.

As shown in FIG. 2, the pocket member 104c is formed separately from the plate member 102 on the cathode side 100b of the plate member and coupled with the plate member adjacent the end section 102c. Although not shown, the pocket member 104d is formed in a similar manner to the pocket member 104c adjacent the end section 102d of the plate member.

As shown in FIG. 2, the plate member 102 includes an S-shaped protrusion 112 extending from an outer edge of the end section 102c at the location of the S-shaped bend in the end section 102a. The S-shaped protrusion extends from, and follows along, at least a part of the first portion 103b, the second portion 103c and at least a part of the third portion 103d of the S-shaped end section 102a. Although not shown, the plate member 102 also includes a similar S-shaped protrusion extending from the outer edge of the end segment 102c at the location of the S-shaped bend in the end segment 102b and may include further S-shaped protrusions extending from an outer edge of the end segment 102d at the locations of the S-shaped bends in the end segments 102a and 102b. The configurations of the S-shaped protrusions are substantially the same as the S-shaped protrusion 112 shown in FIG. 2. In the embodiment shown in FIG. 2, the S-shaped protrusion 112 protrudes from the edge of the plate by a predetermined amount so as to prevent collapse of the manifold sealing gasket, as described in more detail below. In FIG. 2, broken lines are used to show the positioning and width of the manifold sealing gasket that would abut the face of the fuel cell stack after the bipolar separator assembly 100 is assembled into the stack. As shown, the end section 102a of the plate member is configured so that the S-shaped portion of the end section 102a, and the corresponding S-shaped protrusion 112 are located in the middle of the width of the manifold sealing gasket when the bipolar separator assembly 100 is assembled into the stack and the manifold sealing gasket is pressed against the stack face. In this way, when the manifold sealing gasket abuts the fuel cells stack face, the edge of the S-shaped portion of the end section 102a presses into the gasket, thus making an effective seal between the cathode oxidant and anode fuel gases. Moreover, the S-shaped protrusion 112 protrudes into the manifold sealing gasket and acts to stop the manifold sealing gasket from collapsing.

In conventional fuel cells, collapse of the manifold sealing gasket can lead to premature failure of the fuel cell stack due to gas leakage. However, the S-shaped protrusions 112 of the bipolar separator assemblies of the present invention prevent gas leakage and collapsing of the manifold sealing gasket. Specifically, when the manifold sealing gasket is pressed against the fuel cell stack face, the manifold gasket is allowed to only collapse until the S-shaped protrusion hits a solid dielectric member behind the gasket, thereby transferring the load from the gasket to the dielectric member and preventing further collapse of the gasket. In this way, gas leaks between the cathode and anode sides are prevented.

Although in the embodiment shown in FIG. 2, the protrusions have an S shape, it is understood that in other embodiments, the shape of the protrusions may be varied. For example, in some embodiments, the protrusion is linear and only includes the central portion that extends from and follows along the second portion 103c of the respective end section. The linear configuration of the protrusions would achieve similar gas sealing between the cathode and anode sides and would prevent gasket collapse during operation as the S-shaped protrusions described above.

Figure 3A:
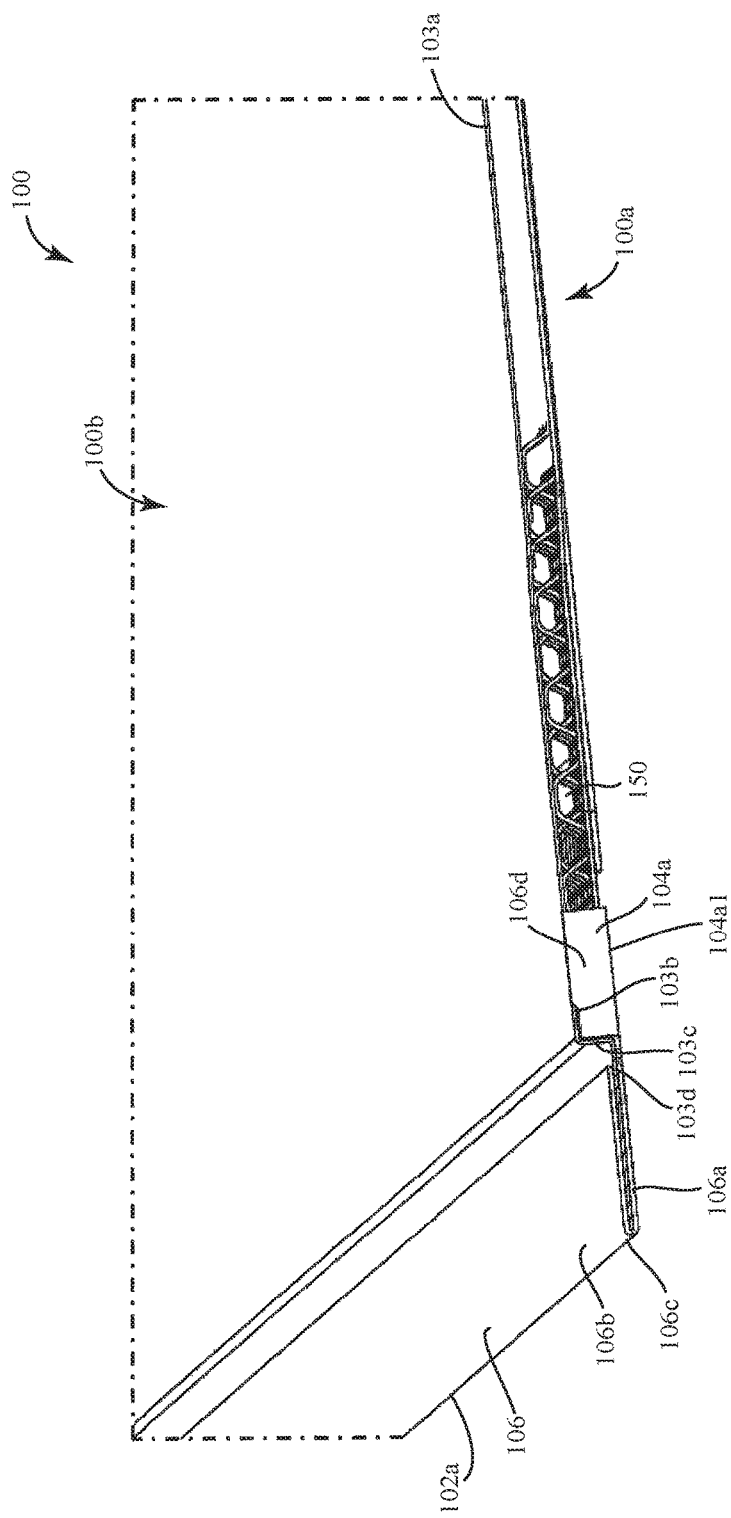
FIG. 3A shows a corner portion of an anode wet seal pocket portion and plate member of the bipolar separator assembly of FIG. 1.
Figure 3B:
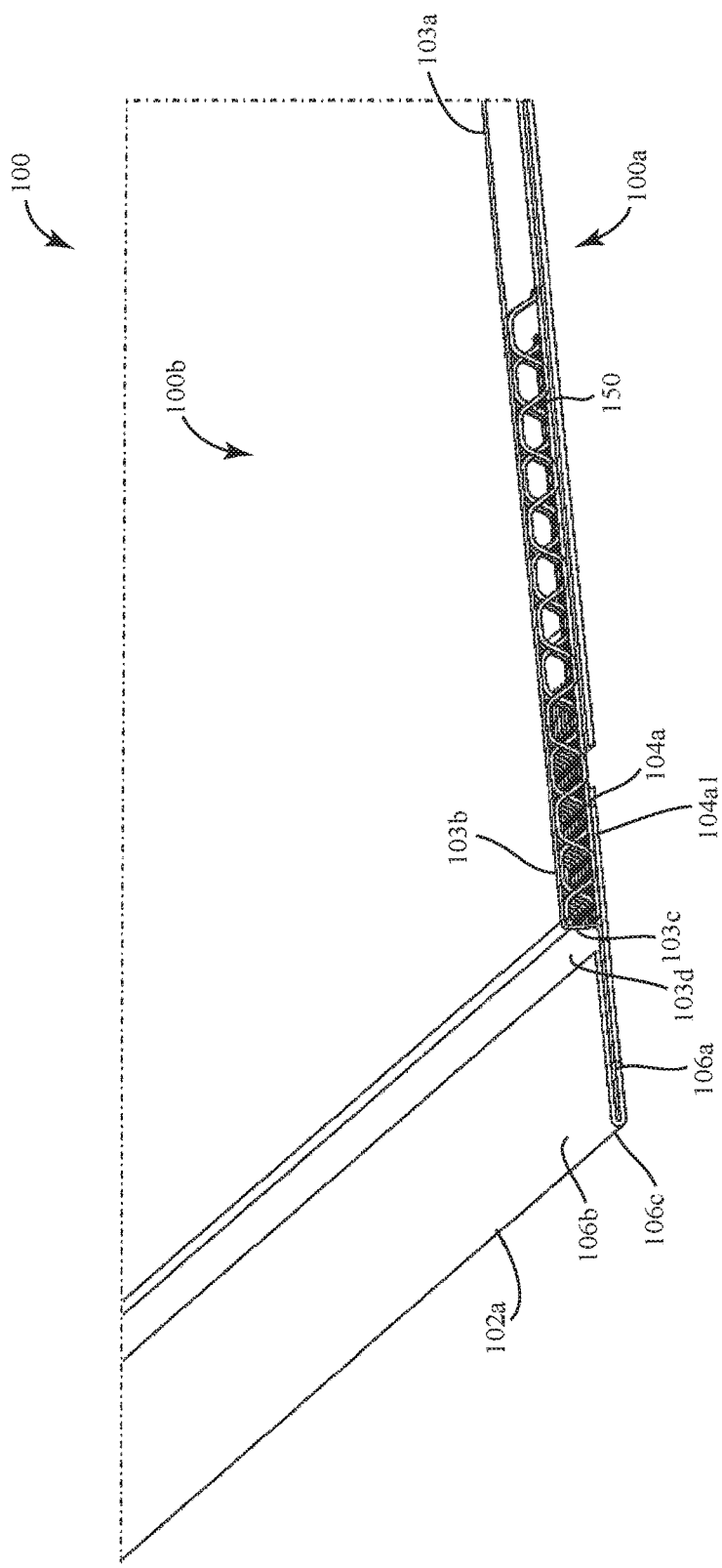
FIG. 3B shows a cross-sectional view of an anode wet seal pocket portion and plate member of the bipolar separator assembly corner of FIG. 1.

FIG. 2 shows the bipolar separator assembly 100 in its assembled state, with the pocket members 104c-d, or portions of the pocket members 104a-b, coupled to separator plate member 102 adjacent the respective end sections 102c-d and 102a-b, and with the anode and cathode current collectors disposed adjacent the anode and cathode surfaces 100a, 100b of the separator plate member 102. FIGS. 3A and 3B show, in more detail, the coupling and sealing between the portions of the pocket member 104a-b with the separator plate member 102. In particular, FIG. 3A shows a partially assembled bipolar separator assembly 100, which includes a corner portion of the plate member 102, the first pocket member 104a and the anode current collector, but does not include the third pocket member 104c coupled to the plate member 102. FIG. 3B shows a portion of a cross-section of the partially assembled bipolar separator assembly 100 of FIG. 3A.

As shown in FIGS. 3A and 3B, the S-shaped end section 102a of the plate member forms a portion of the first pocket member 104a, wherein the second portion 103c of the S-shaped end section 102a forms a sidewall of the first pocket member 104a that extends along the length of the end section 102a. The upper wall of the pocket member 104a is also formed by the end section 102a of the plate member, and in particular, by the first portion 103b, or at least a part of the first portion 103b, of the end section 102a. As also shown, the remaining portion of the pocket member 104a is formed by an anode wet seal member 106, which is formed separately from the plate member 102. The anode wet seal member 106 forms a lower wall 104a1 of the first pocket member 104a and couples the lower wall 104a1 to the end section 102a of the plate member.

As shown in FIGS. 3A-B, the anode wet seal member 106 comprises a U-shaped member which includes a first leg 106a and a second leg 106b parallel to the first leg 106a and integrally coupled to the first leg 106a by a U-shaped connecting portion 106c. As shown in FIG. 3B, the second leg 106b of the anode wet seal member 106a is shorter than the first leg 106a. In coupling the anode wet seal member 106 to the plate member 102, the first leg 106a extends along and adjacent the third portion 103d of the end section 102a and thereafter parallel to the first portion 103b of the end section 102a on the anode side surface 100a of the plate member 102. The part of the first leg 106a extending along the first portion 103b forms the lower wall 104a1 of the first pocket member 104a. The second leg 106b, together with the U-shaped connecting portion 106c, is hemmed around the outer periphery of the third portion 103d of the end section 102a and extends along at least a part of the third portion 103*d* on the cathode side surface 100*b* of the plate member 102, thus creating a hemmed area. With this construction, the first leg 106*a* forms the anode wet seal pocket 104*a*, while the connecting portion 106*c* and the second leg 106*b* form the seal between the fuel gas and the oxidant gas. In particular, when multiple fuel cells are stacked to form a fuel cell stack with the bipolar separator assemblies 100 of the present invention disposed between adjacent fuel cells, the stack pressure is used to seal the gas between the wet seals formed by the pocket members and the electrolyte matrix of the fuel cell. In addition, the stack pressure also acts to seal between the separator plate member 102 and the anode wet seal member 106 in the hemmed area.

Although in FIGS. 3A and 3B, the anode wet seal member 106 is coupled with the separator plate member 102 without using any welding, in certain embodiments, the seal in the hemmed area of the wet seal member 106 may be strengthened by a laser lap-weld so as to permanently join the anode wet seal member 106 to the separator plate member 102. The laser lap-weld may be formed anywhere in the hemmed area of the anode wet seal member 106 and may extend the entire length of the bipolar plate assembly 100.

As shown in FIGS. 3A-3B, the end of the anode current collector 150 is inserted into the pocket member 104*a* created by the first end section 102*a* and the wet seal member 106. The anode current collector 150 stops at the second portion 103*c* of the first end section 102*a*. Each of the S-shaped end sections 102*a*, 102*b* creates a discontinuity, or a shear plane, in the middle of the wet seal region of the fuel cell, with the second portion 103*c* separating the anode current collector from further corrugations in the hemmed area of the fuel cell. The shear plane is bridged by the wet seal itself, rather than by the matrix, and thus protecting the matrix from shearing forces and from cracking.

Referring to FIGS. 2 and 3A, the wet seal member 106 also includes end wall portions 106*d* extending from opposing side ends of the first leg 106*a*. When the wet seal member 106 is coupled with the first end section 102*a*, each end wall portion 106*d* is folded upwardly so as to cover the openings at opposing ends of the first end section and to form opposing end walls of the pocket member 104*a*. As shown in FIGS. 2 and 3A, the end walls 106*d* of the pocket member 104*a* are shaped so as to extend from the lower wall 104*a*1 of the pocket member 104*a* up to the first portion 103*b* of the end section 102*a* forming the upper wall of the pocket member 104*a*, without covering the S-shaped protrusion. Although not shown in FIGS. 2 and 3A-3B, the pocket member 104*b* has a substantially the same construction as the pocket member 104*a*, and includes a like U-shaped wet seal member coupled to the second end section 102*b*. The U-shaped wet seal member of the second pocket member 104*b* has a similar construction and coupling mechanism as the wet seal member 106 of the first pocket member, and also includes end wall portions that form opposing end walls of the pocket member 104*b*.

Figure 4:
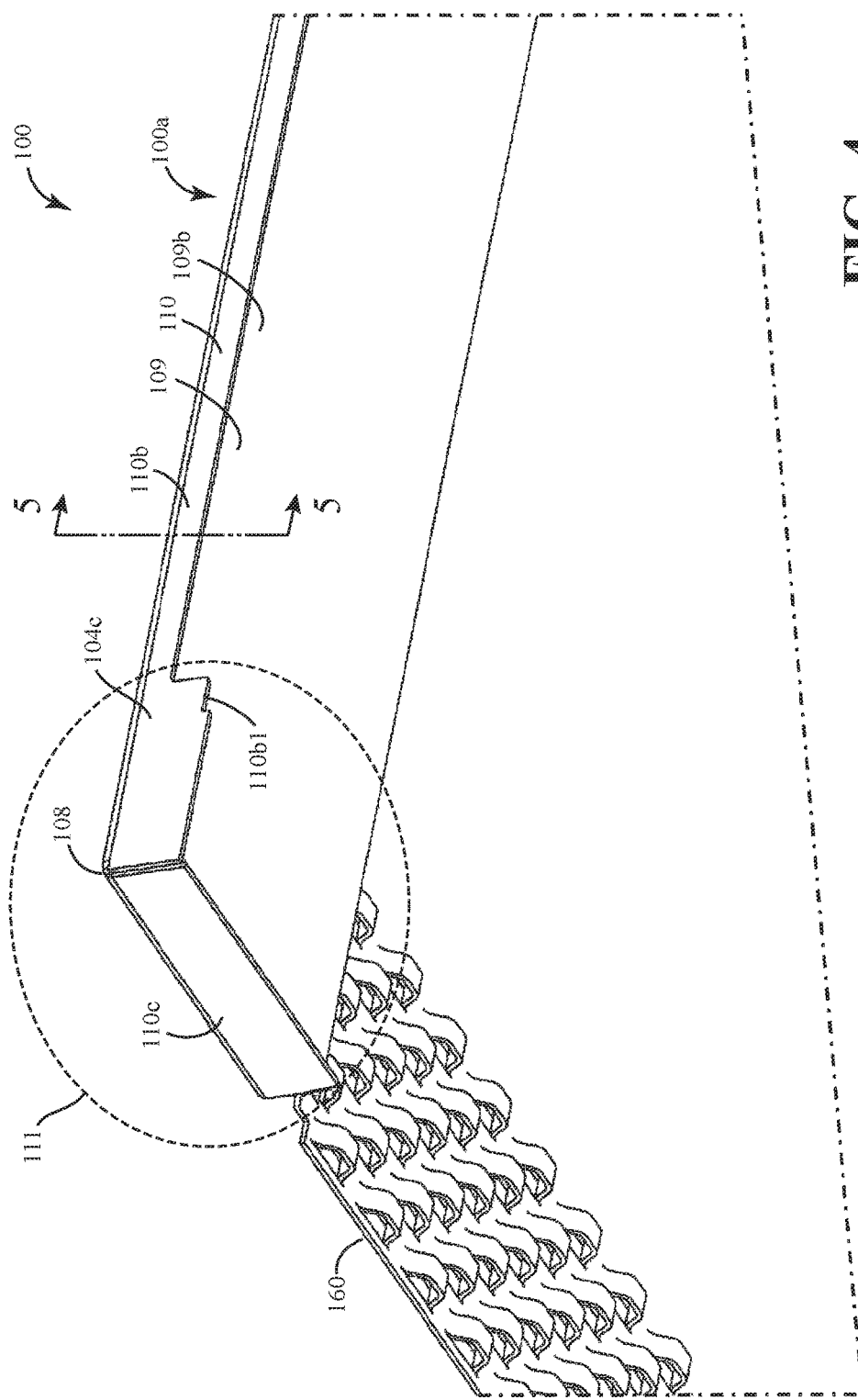
FIG. 4 shows a corner portion of a cathode wet seal pocket portion of the bipolar separator assembly of FIG. 1.
Figure 5:
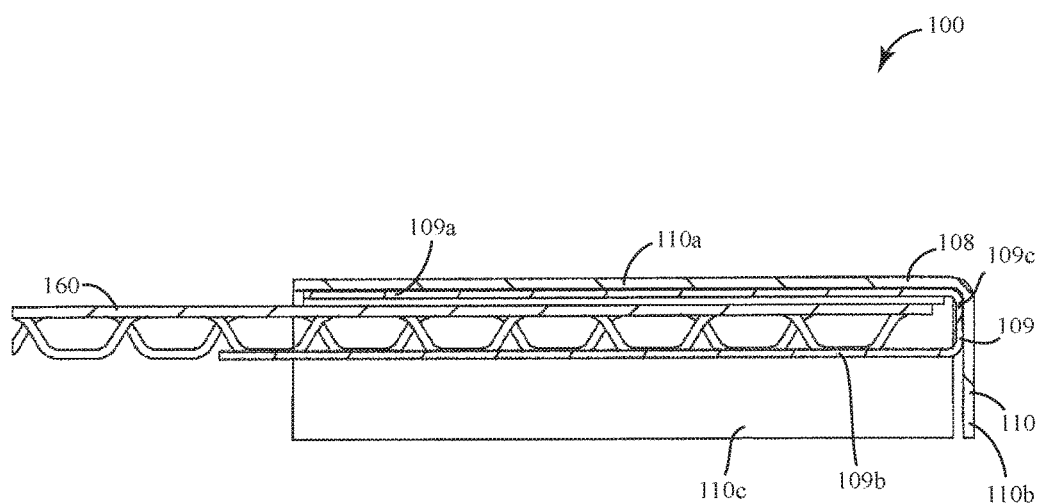
FIG. 5 shows a cross-section of the corner portion of a cathode wet seal pocket portion of FIG. 4.

FIG. 4 shows a first embodiment of a cathode sub-assembly of the bipolar separator assembly 100 of FIGS. 1 and 2, which includes a cathode wet seal member 108 forming the third pocket member 104*c* and the cathode current collector 160 held by the cathode wet seal member 108. In addition, FIG. 5 shows a cross-section of the cathode sub-assembly of FIG. 4 along a line indicated as "Cross-Section" in FIG. 4. As shown in FIGS. 4 and 5, the cathode wet seal member 108 includes a U-shaped channel 109, which forms an inner portion of the third pocket member 104*c*, and an outer wet seal 110 disposed on top of, or at least partially around, the U-shaped channel 109.

As shown in FIGS. 4 and 5, the U-shaped channel 109 includes a first leg or flange 109*a* and a second leg or flange 109*b* which is connected to the first leg 109*a* by a connecting portion 109*c* and which is substantially parallel to the first leg 109*a*. In the embodiment shown in FIG. 5, the first leg 109*a* is shorter than the second leg 109*b*, but in other embodiments, the first and second legs 109*a*, 109*b* may have the same length or the first leg 109*a* may be longer than the second leg 109*b*.

The outer wet seal 110 of this embodiment includes a main wall 110*a*, forming a top wall of the third pocket member 104*c* opposing the plate member 102, a sidewall 110*b* and end walls 110*c*. As shown in FIG. 4, the outer wet seal 110 forms a main or central portion and two corner portions 111 of the third pocket member 104*c* at the ends thereof. The corner portions 111 are formed by the end walls 110*c* and end portions of the sidewall 110*b*, wherein the height of the end walls 110*c* and of the end portions of the sidewall 110*b* is greater than the height of the central portion of the sidewall 110*b*.

In assembling the cathode wet seal member 108, the outer wet seal 110 is placed on top of the U-shaped channel 109 so that the main wall 110*a* of the outer wet seal abuts the first leg 109*a* of the U-shaped channel and the sidewall 110*b* of the outer wet seal 110 abuts the connecting portion 109*c* of the U-shaped channel 109. To assemble the cathode wet seal member 108 with the cathode current collector 160 to form the cathode sub-assembly, an end of the cathode current collector 160 is inserted into the cathode wet seal member 108 and in particular, into the U-shaped channel 109, so that the inner surfaces of the first and second legs 109*a*, 109*b* of the U-shaped channel 109 abut opposing surfaces of the cathode current collector 160.

When the cathode sub-assembly is assembled into the separator assembly and the separator assembly is assembled into the fuel cell stack, the outer surface of the second leg 109*b* of the U-shaped channel abuts the third end section 102*c* of the plate member 102, and the main wall 110*a* of the outer wet seal 110 contacts the electrolyte matrix of the fuel cell. The stack pressure is used for sealing between the outer wet seal 110 and the electrolyte matrix and for sealing between the U-shaped channel 109 and the separator plate member 102. Referring to FIG. 2, which shows the separator assembly in an assembled state, the end wall 110*c* and the end portion of the sidewall 110*b* extends so as to at least cover or enclose the third portion 103*d* of the separator plate member end section coupled with the anode wet seal member 106. In addition, the end portion of the sidewall 110*b* is also shaped to conform to the shape of the separator plate end section 102*a*, and in particular, the end portion of the sidewall 110*b* includes an indentation 110*b*1 therein so as to expose the S-shaped protrusion 112 and to allow the S-shaped protrusion 112 to protrude from the surface of the separator assembly. As mentioned above, in certain embodiments, the protrusion 112 is a linear protrusion instead of an S-shaped protrusion, and in such embodiments, the end portion of the sidewall 110*b* is sized and/or shaped so as to allow the linear protrusion to protrude from the surface of the separator assembly.

Although FIGS. 4 and 5 only show one corner of the cathode wet seal member 108, it is understood that the configuration of the other corner of the cathode wet seal member forming the third pocket member 104*c* is similar to the configuration of the corner shown in FIGS. 4 and 5. In addition, the configuration of the cathode wet seal member forming the fourth pocket member is substantially the same as the configuration of the wet seal member 108 shown in FIGS. 4 and 5. The cathode wet seal members forming the third and fourth pocket members 104c, 104d are formed separately from the separator plate member 102, and in the embodiment shown in FIGS. 4 and 5, the cathode wet seal members are not permanently coupled to the separator plate and do not require the use of welding. Moreover, the corners of the cathode wet seal members in FIGS. 4 and 5 are flat, which is critical for sealing the fuel cell stack to the manifold. As a result, the separator assembly provides for improved sealing of the manifold sealing gaskets to the fuel cell stack and improved sealing between the fuel and oxidant gases in the corners of the stack.

In the embodiment shown in FIGS. 4 and 5, the cathode sub-assembly 108 is formed from two separate pieces, namely, the U-shaped channel 109 and the outer wet seal 110, which may be formed from the same material or from different materials. In certain embodiments, the U-shaped channel 109 and the outer wet seal 110 are formed from one or more metallic materials. However, in other embodiments, the cathode sub-assembly 108 may be formed from a single integral piece or from two pieces which are connected by suitable means to form one a piece cathode sub-assembly.

Figure 6:
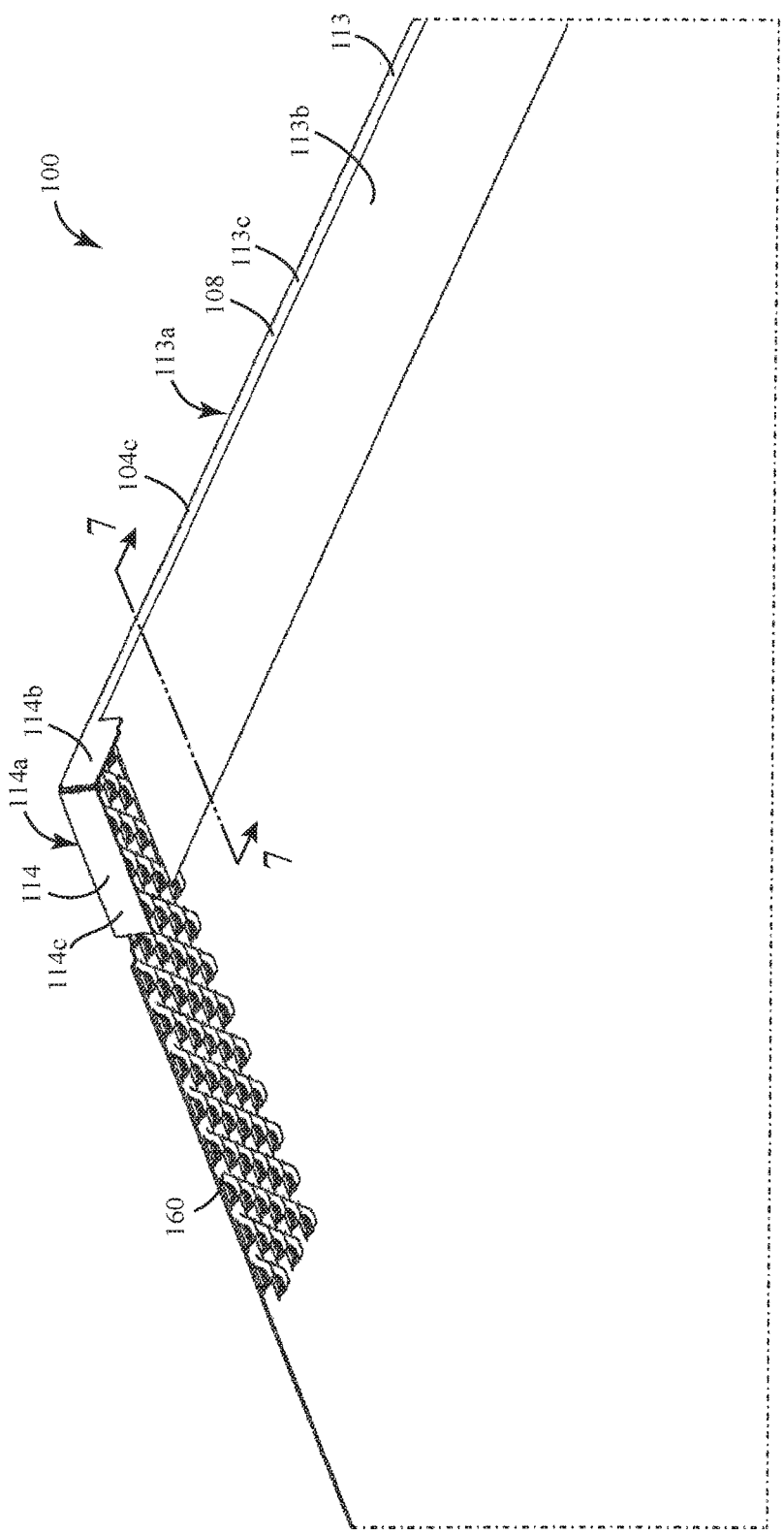
FIG. 6 shows another embodiment of the corner portion of the cathode wet seal pocket portion of the bipolar separator assembly of FIG. 1.
Figure 7:
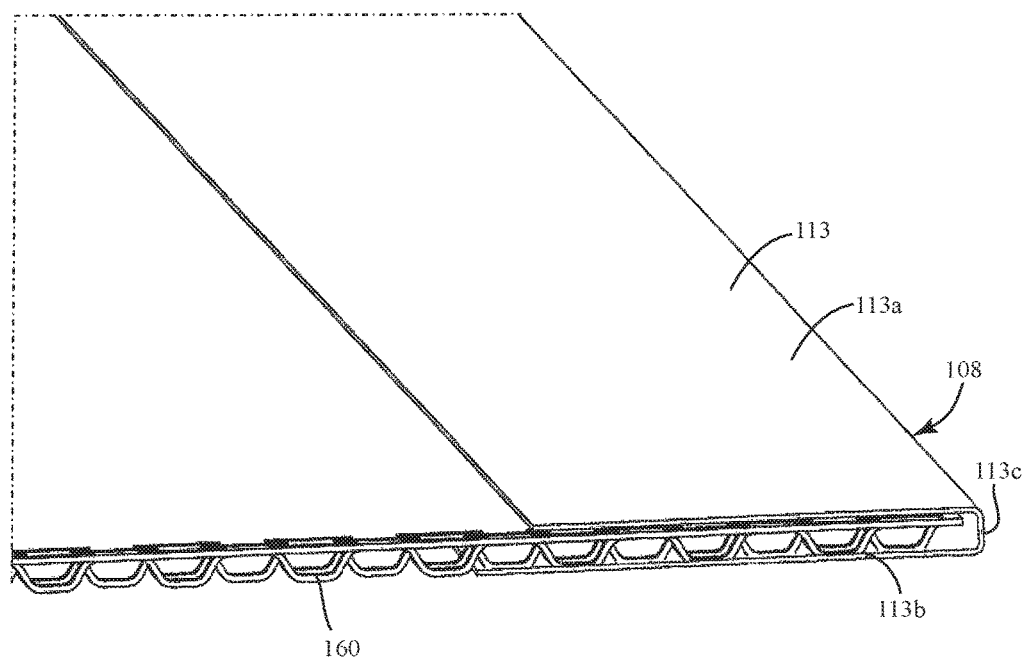
FIG. 7 shows a cross-section of the corner portion of a cathode wet seal pocket portion of FIG. 6.

FIG. 6 shows another embodiment of a cathode sub-assembly of the bipolar separator assembly 100 of FIGS. 1 and 2 with the cathode sub-assembly being formed as a single integral piece. As in the embodiment of FIGS. 4 and 5, the cathode sub-assembly of this embodiment includes a cathode wet seal member 108 forming the third pocket member 104c and the cathode current collector 160 held by the cathode wet seal member 108. In addition, FIG. 7 shows a cross-section of the cathode sub-assembly of FIG. 6 taken along a line indicated as "Cross-section" in FIG. 6. As shown in FIGS. 6 and 7, the cathode wet seal member 108 includes a U-shaped main portion 113 that forms the third pocket member 104c and corner portions 114 that form opposing corners of the pocket member 104c. In the embodiment shown in FIG. 6, the main portion 113 and the corner portions 114 of the cathode wet seal member 108 are integrally formed, preferably from the same piece of metallic material. However, in other embodiments, the corner portions 114 may be attached to the main portion 113 by a suitable means, such as welding or the like. The construction of the main portion 113 of the cathode wet seal member 108 and its attachment to the separator plate member 102 is shown in more detail in FIG. 7.

As shown in FIGS. 6 and 7, the main portion 113 comprises a substantially U-shaped member, including a first leg or flange 113a and a second leg or flange 113b which is connected to the first leg 113a by a connecting portion 113c and which is substantially parallel to the first leg 113a. In the embodiment shown in FIG. 6, the first leg 113a is shorter than the second leg 113b, but in other embodiments, the first and second legs 113a, 113b may have the same length or the first leg may be longer than the first. The first and second legs 113a, 113b form opposing upper and lower walls of the third pocket member, while the connecting portion 113c forms the sidewall of the third pocket member 104c connecting the upper and lower walls. As shown in FIG. 7, the cathode current collector 160 is inserted into the third pocket 104c, and in particular, into the space between the first and second legs 113a, 113b of the cathode wet seal 113. When the separator assembly is assembled into the fuel cell stack, the first leg 113a contacts the electrolyte matrix of the fuel cell while the second leg 113b contacts the third end segment 102c of the separator plate member 102a. Stack pressure is used for sealing between the wet seals and the electrolyte matrix and for sealing between the cathode wet seal 113 and the separator plate member 102.

Referring now back to FIG. 6, the corner portion 114 extending from the main portion 113 is shown and forms the corner of the third pocket member 104c. The corner portion 114 is integral with the main portion, and includes a first wall 114a extending from the first leg 113a of the main portion 113 so as to form the corner of the upper wall of the pocket member 104c and first and second flanges or extensions 114b and 114c extending from the first wall 114a. The first flange 114b is substantially perpendicular to the first wall 114a and is integral with the connecting portion 113c of the main portion 113, forming the corner sidewall portion of the third pocket 104c. The second flange 114c is substantially perpendicular to the first wall 114a and to the first flange 114b, and forms an end wall of the third pocket 104c. If the cathode wet seal member 108 of FIGS. 6 and 7 is used in the separator of FIG. 2, the first and second flanges 114b, 114c extend beyond the height of the connecting portion 113c, and cover or enclose the entire height of the separator assembly corner. Referring to FIG. 2, the first and second flanges 114b, 114c of the wet seal member 108 extend so as to at least cover or enclose the third portion 103d of the separator plate member end section 102a coupled with the anode wet seal member 106. As shown in FIG. 2, the first flange 114b is also shaped to conform to the shape of the separator plate end section 102a, and in particular the first flange 114b includes an indentation 114b1 therein so as to expose the S-shaped protrusion 112 and to allow the S-shaped protrusion 112 to protrude from the surface of the separator assembly. As described above, in some embodiments, the protrusions from the end sections of the plate may have a linear shape, instead of the S-shape. In such embodiments, the first flange 114b may include an indentations corresponding to the linear shape and position of the linear protrusion. Alternatively, the first flange 114b may be configured so that no indentation is required for exposing the linear protrusion. It is understood that the flanges at the other ends of the assembly have similar configurations as the first flange 114b.

When the separator assembly is assembled into the fuel cell stack, one side of the first wall 114a of the corner portion 114, along with the first leg 113a of the main portion 113, contacts the electrolyte matrix of the fuel cell, while the other side of the first wall 114a contacts the cathode current collector 160 inserted into the pocket member 104c. As shown in FIG. 6, the corner portion 114 does not include a wall coextensive with the second leg 113b and the lower surface of the cathode current collector, which is not in contact with the first wall 114a, is open in the subassembly of FIG. 6, and faces the separator plate member 102 hemmed with the second leg 106b of the anode wet seal member 106.

Although FIGS. 6 and 7 only show one corner portion 114 of the cathode wet seal member 108, the configuration of the other corner portion of the cathode wet seal member forming the third pocket member 104c is similar to the configuration of the corner portion 114 of FIGS. 6 and 7. In addition, the configuration of the cathode wet seal member forming the fourth pocket member is substantially the same as the configuration of the wet seal member 108 shown in FIGS. 6 and 7. As in the embodiment of FIGS. 4 and 5, the cathode wet seal members of FIGS. 6 and 7 are formed separately from the separator plate member 102 and in the embodiment shown in FIGS. 6 and 7, the cathode wet seal members are not permanently coupled to the separator plate member 102 and do not require the use of welding. Also as in the embodiment of FIGS. 4 and 5, the corner portions of the cathode wet seal members of FIG. 6 form corners that are as flat as possible, which is critical for sealing the fuel cell stack to the manifold. Therefore, the separator assembly provides for improved sealing of the manifold sealing gaskets to the fuel cell stack and improved sealing between the fuel and oxidant gases in the corners of the stack.

The manufacturing method of the separator assembly of FIGS. 1-7 may be automated. In addition, the manufacturing method of the separator assembly of FIGS. 1-7 allows for placement or positioning of the corrugated current collectors adjacent opposing sides of the separator plate member before, or simultaneously with, attachment or coupling of the wet seal members to the plate member. In this way, the bending and manipulating of the corrugated current collectors to insert them into the wet seal members is avoided. FIGS. 8A-8D illustrate the manufacturing and/or assembling process for manufacturing the separator assembly of FIGS. 1-7. Although FIGS. 8A-8D only show a corner portion of the separator assembly of FIGS. 1-7, it is understood that the constructions of the ends of the assembly that are not shown in FIGS. 8A-8D are similar to those shown in FIGS. 8A-8D.

Figure 8A:
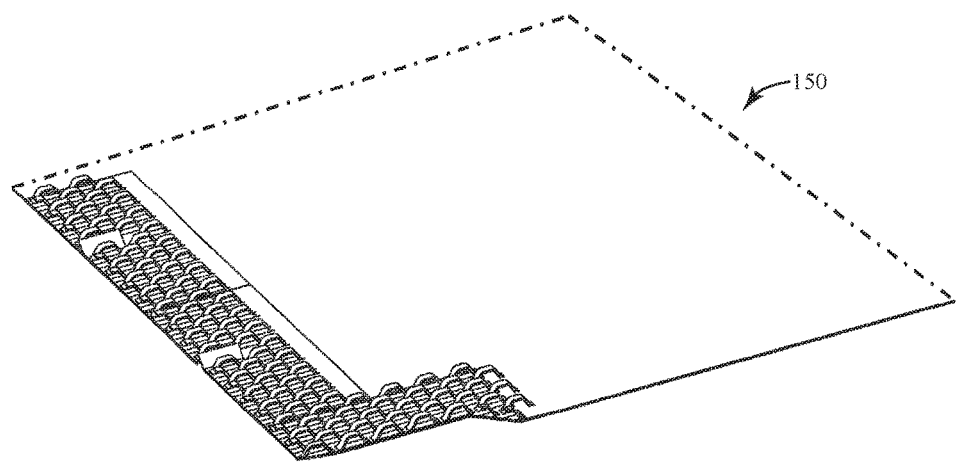
FIGS. 8A-8D show the assembly process for assembling the bipolar separator assembly of FIG. 1.

As shown in FIG. 8A, the first step of manufacturing the separator assembly includes providing an anode current collector 150, such as a corrugated anode current collector. In the first step, the anode current collector may be positioned in a predetermined location and with a predetermined orientation so as to be properly aligned with the other components of the separator assembly during the manufacturing process.

Figure 8B:
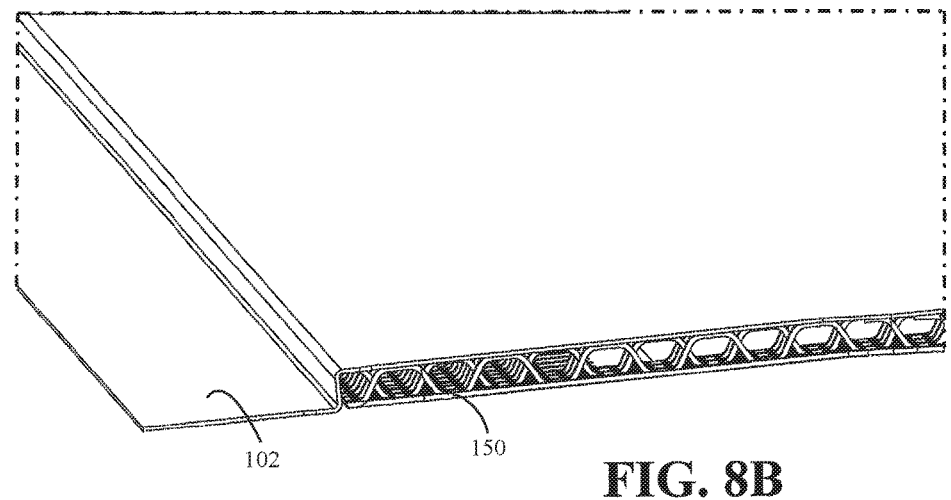

In the second step, shown in FIG. 8B, the separator plate member 102 is provided and placed on top of the anode current collector 150. As shown, in FIG. 8B, the separator plate member 102 is positioned so that the anode side surface 100a of the plate member 102 faces the anode current collector 150 and so that the anode current collector 150 fits within the space formed between the second portions 103c of the plate member end sections 102a, 102b.

Figure 8C:
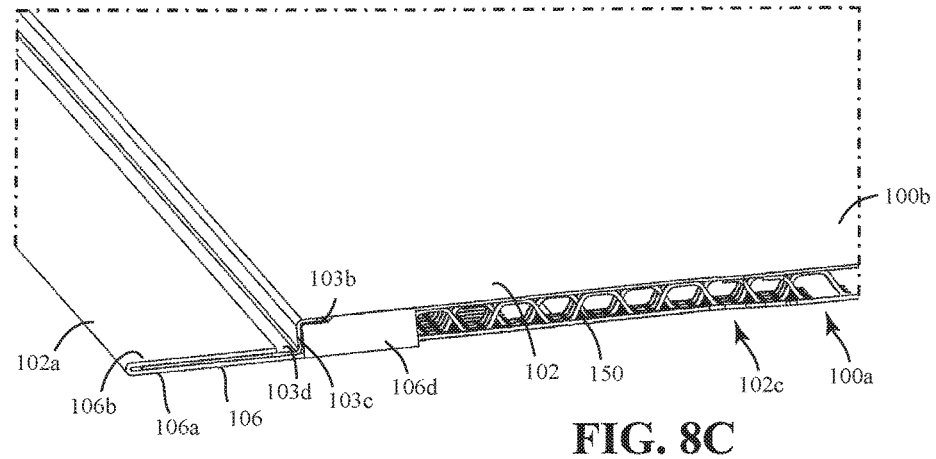

In the third step, shown in FIG. 8C, the anode wet seal member 106 is provided and secured or coupled to the separator plate member 102 by a hemming operation. As described above with respect to FIG. 3, the anode wet seal member 106 includes the first and second legs 106a, 106b connected by the connecting portion 106c, forming the U-shaped member. In addition, the anode wet seal member 106 includes end wall portions 106d provided at opposing ends of the first leg 106a and adapted to cover the openings at opposing ends of the first end section 102a. In the third step of FIG. 8C, the hemming operation is performed by sliding the anode wet seal member 106 onto the third portion 103d of the respective end section 102a, 102b of the plate member 102 so that the first leg 106a of the anode wet seal member 106 extends under the end section 102a or 102b and the second leg 106b is hemmed over the third portion 103d of the end section 102a, 102b.

In some embodiments, the anode wet seal member 106 provided in the third step may be in a substantially planar, unhemmed form so that the first and second legs 106a, 106b and the end wall portions 106d are coplanar with respect to one another. In such embodiments, each unhemmed anode wet seal member 106 is aligned with respect to the respective end section 102a, 102b of the plate member, so that the end wall portions 106d of the wet seal member 106 are properly aligned with the respective end openings formed by the first and second portions 103b, 103c of the plate member end section 102a, 102b. During hemming operation of this embodiment, the second leg 106b of the wet seal member 106 is then folded over respective end section 102a, 102b so that the wet seal member 106 at least partially encloses the third portion 103d of the end section. Similarly, the end wall portions 106d of each wet seal member 106 are folded upwardly so as to cover the openings at opposing ends of the first end section 102a. The resulting anode wet seal member 106 coupled with the plate member 102 and forming a pocket member 104a is shown in FIG. 8C.

Figure 8D:
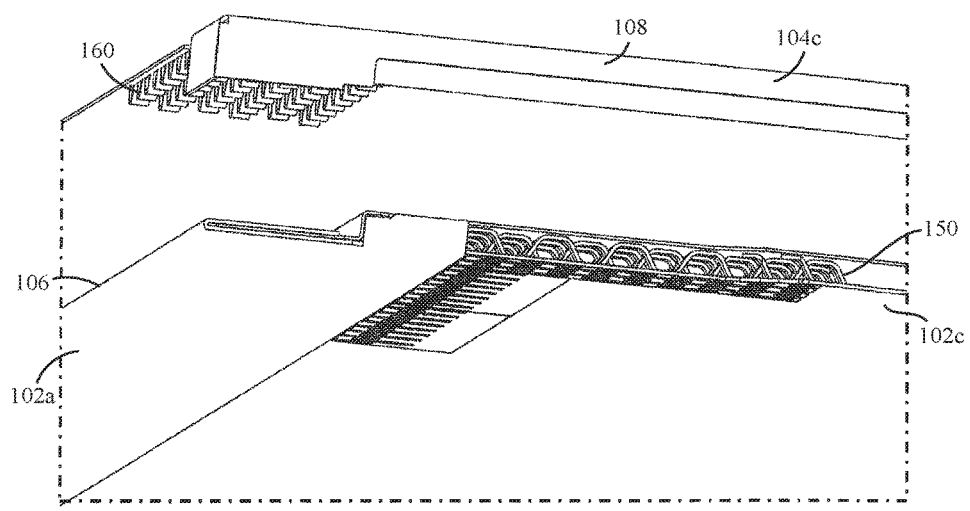

Finally, in the fourth step shown in FIG. 8D, the cathode subassembly of FIG. 4 or of FIG. 6 is provided and assembled with the anode subassembly shown in FIG. 8C. As described herein above, the cathode subassembly includes the cathode current collector 160 and cathode wet seal members 108 forming pocket members 104c, 104d, with opposing ends of the cathode current collector 160 being inserted into the pocket members 104c, 104d formed by two cathode wet seal members 108. In the fourth step, the cathode subassembly is positioned adjacent the cathode surface 100 of the plate member 102 so that the third and fourth pocket members 104c, 104d formed by the cathode wet seal members 108 are aligned with the third and fourth end sections 102c, 102d of the plate member 102.

The manufacturing and/or assembly process shown in FIGS. 8A-8D may be automated so as to reduce the manufacturing time and costs and to increase production rates for separator assemblies of the present invention. In addition, the method of FIGS. 8A-8D allows the cathode and anode current collectors to be placed prior to assembly of the pocket members with the separator plate, thus eliminating manual manipulation and the requirements for bending of the current collectors or for using several separate pieces to form each current collector. In automating the manufacturing process of FIGS. 8A-8D, suitable manufacturing assembly including equipment known in the art may be used for supporting, positioning and assembling the components of the separator assemblies. In addition, the manufacturing assembly may include a controller which controls the formation of the anode-side sub-assembly, as shown in FIGS. 8A-8B, controls the formation of the cathode-side sub-assembly shown in FIG. 8C and controls the assembly of the anode-side and cathode-side sub-assemblies to form the separator assembly.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We claim:

1. A method of forming a bipolar separator assembly for use in a fuel cell assembly, said method comprising:
   a step of forming an anode-side sub-assembly, which comprises sub-steps of:
      providing an anode current collector,
      providing a plate member having first and second opposing surfaces compatible with fuel and oxidant gases, respectively, first and second opposing end segments and third and fourth opposing end segments transverse to the first and second opposing end segments,
      positioning said plate member so that said anode current collector abuts the first surface of the plate member,
      providing first and second anode wet seal members formed separately from the plate member, and
      releasably securing the first and second anode wet seal members to the plate member so as to form first and second pockets on the first surface of the plate member and to enclose opposing ends of the anode current collector;
a step of forming a cathode-side sub-assembly, which comprises sub-steps of:
providing a cathode current collector;
providing first and second cathode wet seal members formed separately from the plate member; and
releasably securing the first and second cathode wet seal members to the cathode current collector so as to form third and fourth pockets and to enclose opposing ends of the cathode current collector; and
a step of assembling the cathode-side sub-assembly with the anode-side sub-assembly so that the cathode-side sub-assembly abuts the second surface of the plate member of the anode-side sub-assembly and the first and second cathode wet seal members form the third and fourth pockets adjacent the second surface of the plate member.

2. The method in accordance with claim 1, wherein:
the first end segment of the plate member forms a first portion of the first pocket member and the second end segment of the plate member forms a first portion of the second pocket member,
the first anode wet seal member separately forms a second portion of the first pocket member,
the second anode wet seal member separately forms a second portion of the second pocket member, and
said releasably securing the first and second anode wet seal members to the plate member comprises releasably securing the first anode wet seal member to the first end segment of the plate member and releasably securing the second anode wet seal member to the second end segment of the plate member.

3. The method in accordance with claim 2, wherein the plate member includes first and second protrusions protruding from an outer periphery of the third end segment, and wherein each of the first and second protrusions is positioned so as to protrude into a manifold sealing gasket when the bipolar separator assembly is assembled into a fuel cell stack.

4. The method in accordance with claim 1, wherein:
the plate member comprises a planar central area disposed between the first and second end segments, and
each of the first and second end segments includes:
a first portion co-planar with, and extending from, the central area,
a second portion following the first portion and extending transverse to the first portion outwardly from a first surface of the first portion, and
a third portion following the second portion and extending transverse to the second portion in a direction away from, and substantially parallel to, the first portion,
the first and second portions of the first end segment form the first portion of the first pocket member, and
the first and second portions of the second end segment form the first portion of the second pocket member.

5. The method in accordance with claim 4, wherein:
each cathode wet seal member includes:
a U-shaped channel member having a bottom wall abutting the respective third or fourth end segment, a top wall opposing the bottom wall, a sidewall connecting the top and bottom walls; and
an outer wet seal positioned relative to the U-shaped channel member so as to partially enclose the U-shaped channel member and having a top wall abutting the top wall of the U-shaped channel member, a sidewall abutting the sidewall of the U-shaped channel member and opposing end walls.

6. The method in accordance with claim 5, wherein:
said plate member includes:
first and second protrusions protruding outwardly from an outer edge of the third end segment and aligned with the first and second end segments of the plate member so that at least a portion of each protrusion is co-extensive with the second portion of the respective first or second end segment, and
third and fourth protrusions protruding outwardly from an end of the fourth end segment and aligned with the first and second end segments of the plate member so that at least a portion of each protrusion is co-extensive with the second portion of the respective first or second end segment.

7. The method in accordance with claim 1, wherein said method is automated and said steps of forming said anode-side sub-assembly, forming said cathode-side sub-assembly and assembling the cathode-side sub-assembly with the anode-side sub-assembly are controlled by a controller.

8. The method in accordance with claim 2, wherein the first and second cathode wet seal members separately form the third and fourth pocket members, respectively, and said releasably securing the first and second cathode wet seal members to the cathode current collector comprises releasably securing the first and second cathode wet seal members at their respective positions adjacent the third and fourth end segments of the plate member using pressure in a fuel cell stack.

9. The method in accordance with claim 3,
wherein the plate member further includes third and fourth protrusions protruding from an outer periphery of the fourth end segment, and
wherein each of the third and fourth protrusions is positioned so as to protrude into the manifold sealing gasket when the separator assembly is assembled into a fuel cell stack.

10. The method in accordance with claim 3, wherein each of the first and second protrusions is S-shaped.

11. The method in accordance with claim 9, wherein each of the first, second, third, and fourth protrusions is S-shaped.

12. The method in accordance with claim 4, wherein:
each anode wet seal member includes:
first and second legs integrally connected to one another, the second leg being parallel to the first leg and having a shorter length than the first leg, and
first and second extensions at opposing sides of the first leg and extending from the one part of the first leg forming the second portion of the respective first or second pocket; and
releasably securing the first and second anode wet seal members to the plate member comprises:
positioning said respective anode wet seal member with respect to said respective first or second pocket member so that one part of the first leg of the anode wet seal member forms the second portion of the respective first or second pocket member and another part of the first leg extends along the third portion of the respective first or second end segment,
hemming the second leg of the respective anode wet seal member around the third portion of the respective first or second end segment so that the second leg abuts the second surface of the third portion of the respective first or second end segment, and folding the first and second extensions of the respective anode wet seal member toward the first portion of the respective first or second end segment of the plate member to form respective end walls of the respective first or second pocket.

13. The method in accordance with claim 5, wherein:
the outer wet seal includes a central portion and first and second corners extending from opposing ends of the central portion to form opposing corners of the respective third or fourth pocket, and
wherein heights of the opposing end walls and of the sidewall of the outer wet seal in the first and second corners extend beyond a height of the central portion of the sidewall of the outer wet seal and at least up to the third portion of the respective first or second end segment of the plate member.

14. The method in accordance with claim 13, wherein each corner of the outer wet seal is configured so as to allow a corresponding protrusion to extend beyond an outer periphery of the outer wet seal.

15. The method in accordance with claim 1, wherein:
said plate member comprises a substrate formed from a first metallic material; and
each of said first and second anode wet seal members and said first and second cathode wet seal members comprises a substrate formed from said first metallic material.

16. The method in accordance with claim 1, wherein:
said plate member comprises a substrate formed from a first metallic material; and
each of said first and second anode wet seal members and said first and second cathode wet seal members comprises a substrate formed from a second metallic material different from said first metallic material.

* * * * *